United States Patent
Avanzi et al.

(10) Patent No.: US 9,736,536 B2
(45) Date of Patent: Aug. 15, 2017

(54) COUNTERMEASURES AGAINST AUDIO/VIDEO CONTENT SECURITY DOMAIN CROSSING

(71) Applicant: QUALCOMM Incorporated, San Diego, CA (US)

(72) Inventors: Roberto Avanzi, Munich (DE); Simo Petteri Kangaslampi, San Diego, CA (US); Ron Keidar, San Diego, CA (US); Chang-Kuk Choi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 221 days.

(21) Appl. No.: 14/677,762

(22) Filed: Apr. 2, 2015

(65) Prior Publication Data

US 2016/0295283 A1    Oct. 6, 2016

(51) Int. Cl.
*H04N 21/4627*    (2011.01)
*H04N 21/439*    (2011.01)
*G06F 21/10*    (2013.01)

(52) U.S. Cl.
CPC ......... *H04N 21/4627* (2013.01); *G06F 21/10* (2013.01); *H04N 21/4394* (2013.01); *H04N 21/4398* (2013.01); *G06F 2221/07* (2013.01); *H04L 2209/603* (2013.01)

(58) Field of Classification Search
CPC .......... H04N 21/4627; H04N 21/4394; H04N 21/8545; H04N 21/233; H04N 21/4542; G06F 21/10; G06F 2221/07; G06F 21/6218; G06F 21/105; G06F 3/04842; G06F 17/30; G06F 17/3082; G06F 17/30752; G06F 17/30026; G06F 3/0482; G06F 2221/0713; G06Q 30/06; Y10S 707/916; Y10S 707/914; Y10S 707/944
See application file for complete search history.

(56) References Cited

U.S. PATENT DOCUMENTS

| | | | |
|---|---|---|---|
| 4,626,845 A * | 12/1986 | Ley | H04W 84/08 178/70 R |
| 7,707,224 B2 * | 4/2010 | Chastagnol | G06Q 30/06 707/705 |
| 7,770,031 B2 | 8/2010 | MacKay et al. | |

(Continued)

OTHER PUBLICATIONS

International Search Report and Written Opinion—PCT/US2016/024208 —ISA/EPO—Jun. 13, 2016—10 pgs.

*Primary Examiner* — Saleh Najjar
*Assistant Examiner* — Shu Chun Gao
(74) *Attorney, Agent, or Firm* — Hunter Clark PLLC

(57) ABSTRACT

Techniques for preventing circumvention of digital rights management protections on electronic content are provided. A method according to these techniques includes receiving a content stream, obtaining samples from the content stream, generating a histogram based on the samples from the content stream, classifying the content stream as including audio content or non-audio content based on the histogram, and modifying portions of the content stream responsive to classifying the content stream as including non-audio content. The content stream can be modified such that any video content included in the content stream would be rendered unplayable, while audio content included in the content stream remains playable.

30 Claims, 9 Drawing Sheets

(56) References Cited

U.S. PATENT DOCUMENTS

| | | | |
|---|---|---|---|
| 8,010,469 B2 | 8/2011 | Kapoor et al. | |
| 8,463,000 B1* | 6/2013 | Kaminski, Jr. | ... G06F 17/30628 |
| | | | 382/100 |
| 9,104,881 B2* | 8/2015 | Granstrom | ............... G06F 21/60 |
| 2004/0078574 A1* | 4/2004 | Noga | ...................... H04L 63/12 |
| | | | 713/176 |
| 2009/0144325 A1* | 6/2009 | Chastagnol | ............ G06Q 30/06 |
| 2011/0289598 A1* | 11/2011 | Chastagnol | ............ G06Q 30/06 |
| | | | 726/28 |
| 2013/0305388 A1 | 11/2013 | Kottilingal et al. | |
| 2014/0095890 A1 | 4/2014 | Mangalore et al. | |
| 2014/0172422 A1 | 6/2014 | Hefetz | |

* cited by examiner

Computing Device

Computing Device

Classifying
Audio Content
to Prevent
Circumvention
of Protection

Classifying Content Stream

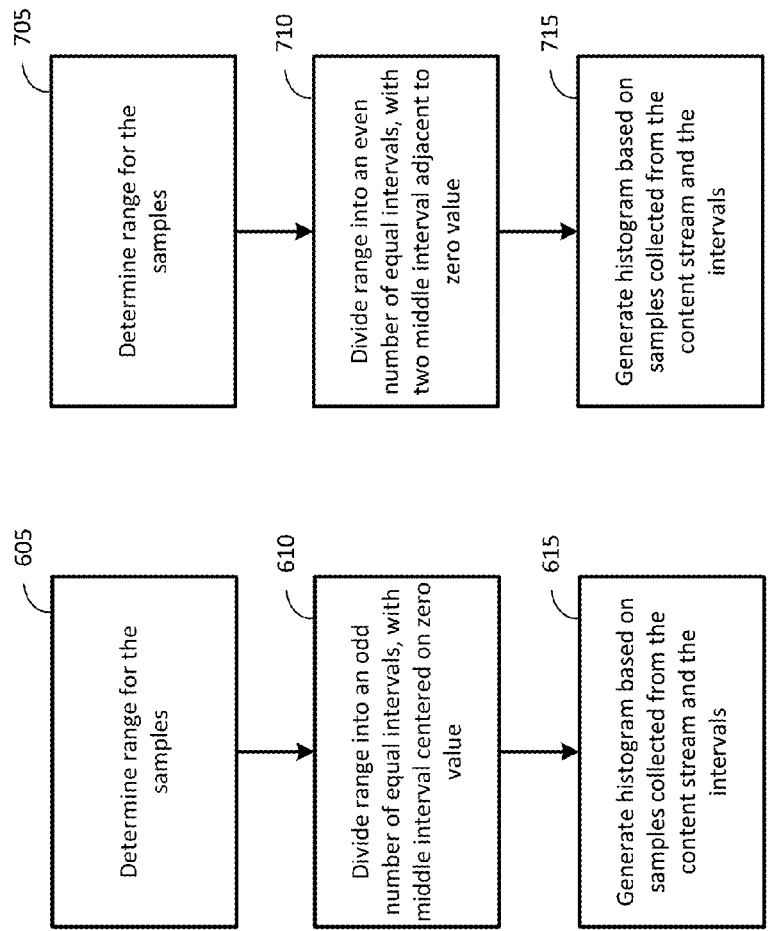

Generate Histogram
(fuzzy intervals)

Generate Histogram
(absolute value intervals)

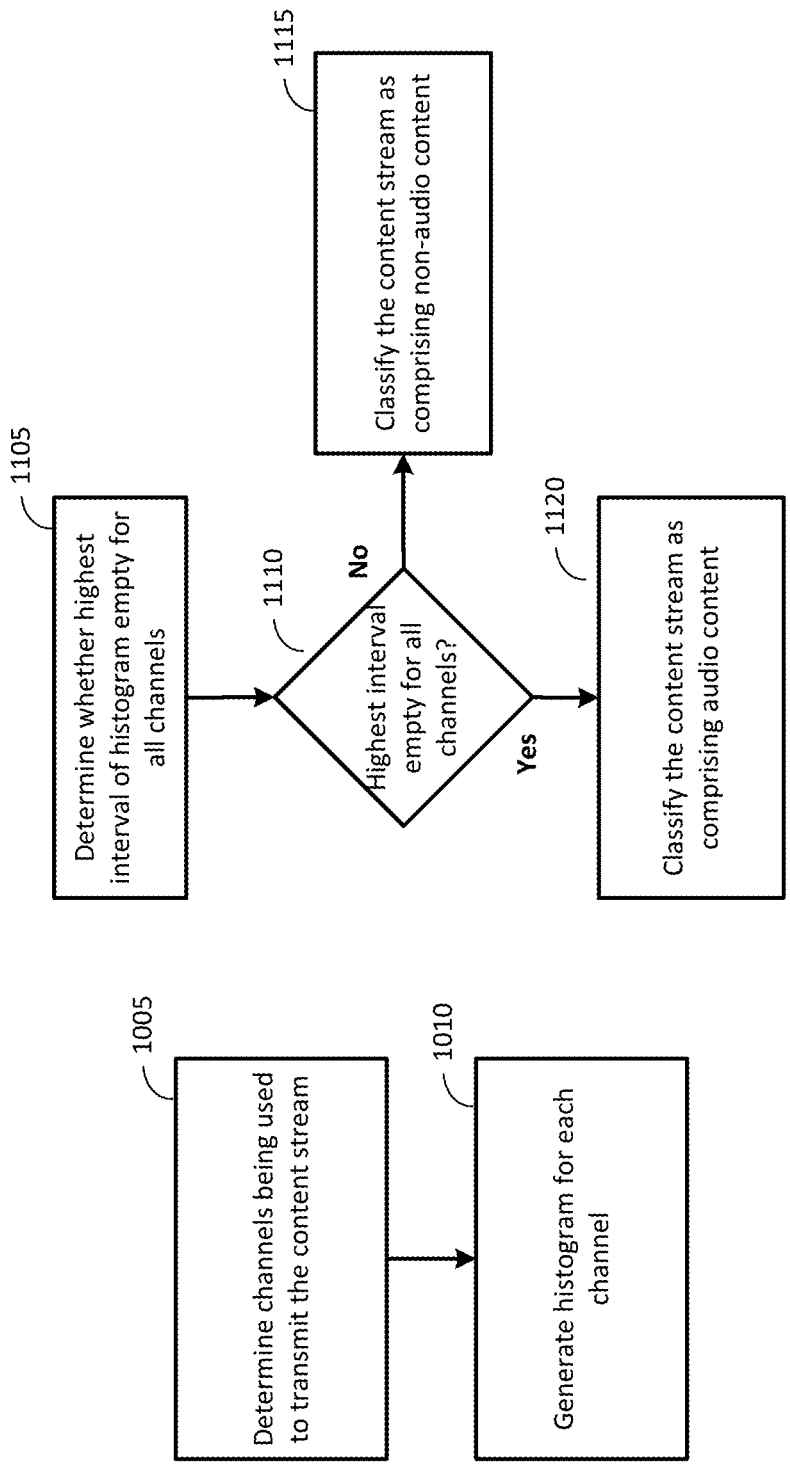

Generate Histograms
(remove DC)

US 9,736,536 B2

COUNTERMEASURES AGAINST AUDIO/VIDEO CONTENT SECURITY DOMAIN CROSSING

BACKGROUND

Most conventional digital rights management (DRM) schemes (content delivery and link protection protocols) use the same key and nonce for both the audio and video substreams of a premium content streams and typically do not provide any means for telling audio and video streams apart. Some examples of such DRM schemes include Google Widevine, Microsoft's Playread, and High-bandwidth Digital Content Protection (HDCP).

Many devices, including mobile phones, set top boxes, and other devices configured to handle DRM protected content, include a trusted content protection module and implement a protected video processing path that is intended to prevent the DRM protections on the video content from being subverted. However, similar protections are typically not provided on the audio processing paths. The audio content may be unencrypted and released to the high level operating system (HLOS) of the device without verification. An attacker can exploit this weakness to obtain unencrypted video content, because the audio processing path does not actually determine whether the content being unencrypted is actually audio content. An attacker could circumvent the protection on video content by instructing the trusted content protection module of the device that desired video content is audio content or by interleaving video content with audio content. The video content will then be unencrypted and provided to the HLOS, thereby circumventing the DRM protections on the video content and allowing the unrestricted access to the unencrypted video content. An attacker could potentially obtain the entirety the video content of DRM protected video content by interleaving portions of the video content with audio content to obtain the encrypted content and reassembling the unencrypted video content. This approach may require the attacker to interleave portions of the video content with audio content multiple times to obtain the entire unencrypted video content, but once the entire video content has been obtained, the attacker could freely distribute the content without any DRM protections.

Conventional solutions that can be used with MPEG-1 or MPEG-2 Layer III (MP3) or Advanced Audio Coding (AAC) content include limiting the overall bandwidth of content streams and detecting the frame starts within the content stream. Frames have maximum length, and if a frame header does not occur within the expected length for the type of content being streamed, then the data can be flagged as non-audio content. However, data corruption needs to be taken into account when monitoring for frame headers, so multiple frames worth of data should be monitored before determining whether the flag the content stream as comprising non-audio content. After a predetermined number of frames are flagged as non-audio, the streaming of the content can be aborted. Another solution is to model video as random data. But, this approach is very computationally intensive, and may not be suitable for use on mobile devices that may have limited processing power and a limited onboard power supply.

But, the techniques discussed above do not work for Pulse-Code Modulation (PCM) audio format, and in particular for situations where audio content is streamed as linear PCM, uncompressed audio but the video is still transmitted in a compressed format. The PCM audio content is raw data that does not include any identifiable headers like the MP3 or AAC format which can be used to distinguish audio content streams from video content streams. Attempts have been made to analyze the content stream to determine the stream's spectrum and to classify the content stream as non-audio content if the stream has a spectrum that is too close to noise. But, this approach is computationally prohibitive, particularly in mobile devices, which may be constrained in both processing resources and power consumption. This approach also will result in the rejection of audio content that includes portions that are similar to white or pink noise or that present significant distortion. Audio with such characteristics do occur occasionally in audio content and the playback of such content would be mistakenly marked as video content and interrupted using conventional techniques.

SUMMARY

A method for preventing circumvention of digital rights management protections on electronic content according to the disclosure includes receiving a content stream, obtaining samples from the content stream, generating a histogram based on the samples from the content stream, classifying the content stream as including audio content or non-audio content based on the histogram, and modifying portions of the content stream responsive to classifying the content stream as including non-audio content.

Implementations of such a method may include one or more of the following features. Modifying the portions of the content stream include modifying the content stream such that video content included in the content stream is rendered unplayable. Modifying the portions of the content stream includes modifying the content stream such that video content included in the content stream is rendered unplayable. Modifying the portions of the content stream includes modifying one or more least significant bits of the content stream. Classifying the content stream as audio content or non-audio content further includes determining whether a highest sample interval of the histogram is empty. Classifying the content stream as audio content or non-audio content further includes classifying the content stream as audio content responsive to the histogram comprising a bell shape or the highest sample interval of the histogram being empty. Generating the histogram based on the samples from the content stream includes generating a respective histogram for each audio channel of the content stream. Classifying the content stream as audio content or non-audio content includes classifying the content stream as audio content responsive to the histogram comprising a bell shape or the highest sample interval of each respective histogram being empty.

An apparatus according to the disclosure includes means for receiving a content stream, means for obtaining samples from the content stream, means for generating a histogram based on the samples from the content stream, means for classifying the content stream as including audio content or non-audio content based on the histogram, and means for modifying portions of the content stream responsive to classifying the content stream as non-audio content.

Implementations of such an apparatus may include one or more of the following features. The means for modifying the portions of the content stream include means for modifying the content stream such that video content included in the content stream is rendered unplayable. The means for modifying the portions of the content stream include means for modifying one or more least significant bits of the content stream. The means for modifying the portions of the content stream includes means for modifying the content stream such that audio content included in the content stream remains playable with minimally audible audio artifacts. The means for classifying the content stream as audio content or non-audio content include means for determining whether a highest sample interval of the histogram is empty. The means for classifying the content stream as audio content or non-audio content further include means for classifying the content stream as audio content responsive to the histogram comprising a bell shape or the highest sample interval of the histogram being empty. The means for generating the histogram based on the samples from the content stream include means for generating a respective histogram for each audio channel of the content stream. The means for classifying the content stream as audio content or non-audio content include means for classifying the content stream as audio content responsive to the histogram comprising the bell shape or a highest sample interval of the histogram of each of the respective histograms being empty.

A computing device according to the disclosure include a processor configured to receive a content stream, obtain samples from the content stream, generate a histogram based on the samples from the content stream, classify the content stream as audio content or non-audio content based on the histogram, and modify portions of the content stream responsive to classifying the content stream as non-audio content.

Implementations of such a computing device can include one or more of the following features. The processor being configured to modify the portions of the content stream is further configured to modify the content stream such that video content included in the content stream is rendered unplayable. The processor being configured to modify the portions of the content stream is further configured to modify one or more least significant bits of the content stream. The processor being configured to modify portions of the content stream is further configured to modify the content stream such that audio content included in the content stream remains playable with minimally audible audio artifacts. The processor being configured to classify the content stream as audio content or non-audio content further is further configured to determine whether a highest sample interval of the histogram is empty. The processor being configured to classify the content stream as audio content or non-audio content further is further configured to classify the content stream as audio content responsive to the histogram comprising a bell shape or the highest sample interval of the histogram being empty. The processor being configured to generate the histogram based on the samples from the content stream is further configured to generate a respective histogram for each audio channel of the content stream. The processor being configured to classify the content stream as audio content or non-audio content is further to classify the content stream as audio content responsive to the histogram comprising the bell shape or a highest sample interval of the histogram of each of the respective histograms being empty.

A non-transitory, computer-readable medium, having stored thereon computer-readable instructions for preventing circumvention of digital rights management protections on electronic content, according to the disclosure includes instructions configured to cause a computer to receive a content stream, obtain samples from the content stream, generate a histogram based on the samples from the content stream, classify the content stream as comprising audio content or non-audio content based on the histogram, and modify portions of the content stream responsive to classifying the content stream as non-audio content.

Implementations of such a non-transitory, computer-readable medium may include one or more of the following features. The instructions configured to cause the computer to modify the portions of the content stream include instructions configured to cause the computer to modify the content stream such that video content included in the content stream is rendered unplayable. The instructions configured to cause the computer to modify the portions of the content stream include instructions configured to cause the computer to modify one or more least significant bits of the content stream. The instructions configured to cause the computer to modify the portions of the content stream include instructions configured to cause the computer to modify the content stream such that audio content included in the content stream remains playable with minimally audible audio artifacts. The instructions configured to cause the computer to classify the content stream as audio content or non-audio content include instructions configured to cause the computer to determine whether a highest sample interval of the histogram is empty. The instructions configured to cause the computer to classify the content stream as audio content or non-audio content include instructions configured to cause the computer to classify the content stream as audio content responsive to the histogram comprising a bell shape or the highest sample interval of the histogram being empty. The instructions configured to cause the computer to generate the histogram based on the samples from the content stream include instructions configured to cause the computer to generate a respective histogram for each audio channel of the content stream. The instructions configured to cause the computer to classify the content stream as audio content or non-audio content include instructions configured to cause the computer to classify the content stream as audio content responsive to the histogram comprising a bell shape or the highest sample interval of each respective histogram being empty.

BRIEF DESCRIPTION OF THE DRAWINGS

FIG. 6 is a flow diagram of an example process for generating a histogram according to the techniques discussed herein.

FIG. 7 is a flow diagram of another example process for generating a histogram according to the techniques discussed herein.

FIG. 10 is a flow diagram of another example process for generating histograms according to the techniques discussed herein.

FIG. 11 is a flow diagram of an example process for classifying a content stream having multiple channels as audio content or non-audio content according to the techniques discussed herein.

DETAILED DESCRIPTION

Techniques are disclosed provide countermeasures for preventing the crossing of audio and video security domains in protected electronic content. The techniques disclosed herein prevent an attacker from passing off digital rights protected video content as audio content in order to circumvent the protection scheme. The techniques disclosed herein can be used to sample and model audio content from one or more channels of a content stream to identify instances where video content may be being passed off as audio content. If non-audio content is suspected to be included in one or more channels of the content stream, portions of the content stream can be altered such that any video content included in the content stream is rendered unplayable. The changes made to the portions of the content stream are such that if audio content is mistakenly flagged as video content, the changes made to the portions of the content stream may slightly affect the audio quality but do not render the audio content unplayable. The audio content included in the content stream remains playable with minimally audible audio artifacts. The techniques disclosed herein can be used with PCM audio content and/or other audio types of content streams, because the techniques do not rely on frame headers to identify audio content. Furthermore, the techniques disclosed herein are not computationally prohibitive and can be implemented on mobile devices, which may have restricted processing power and/or power constraints.

Example Network Environment

Figure 1:
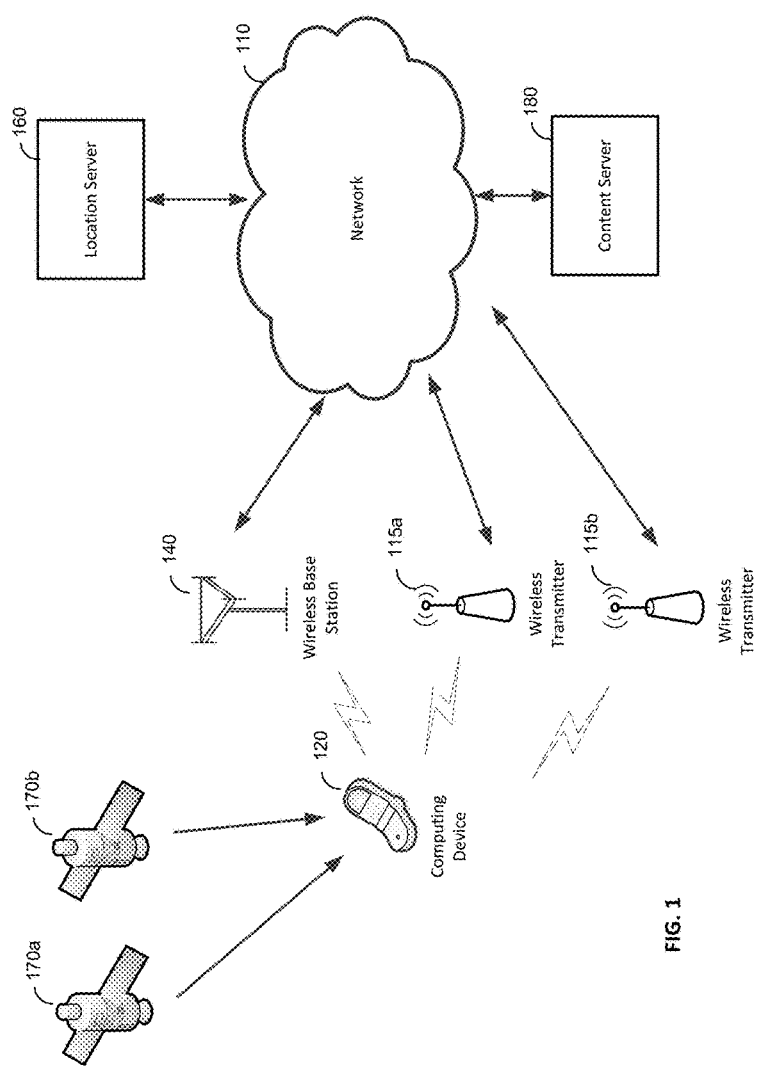
FIG. 1 is a block diagram of an example network architecture, which may be suitable for implementing the techniques discussed herein.

FIG. 1 is a block diagram of an example network architecture, which may be suitable for implementing the techniques discussed herein. The particular configuration illustrated herein is merely an example of one network configuration in which the techniques disclosed herein may be used. Furthermore, an implementation of such a network architecture may include additional elements that are not illustrated herein and have been omitted for the sake of clarity. The example network architecture provides an example of a network environment in which a computing device in which the techniques disclosed herein may be implemented can operate, but the computing device can also be a configured to operate as a stand-alone device that may or may not be networked with other devices. Furthermore, the computing device may be portable or may be installed at a semi-fixed location, such as a set top box or desktop computing system that is capable of being moved but is typically not moved often.

The computing device 120 may also be a mobile communication device referred to as a User Equipment (UE), a mobile station, a terminal, an access terminal, a subscriber unit, a station, etc. The computing device 120 may be a smartphone, a tablet computer, a laptop computer, game console, wearable device (such as a smart watch) or other device that includes a wireless transmitter that is configured to communicate using one or more wireless communications protocols, including, but not limited to, the Long Term Evolution (LTE), WiFi, and WiMAX wireless communications protocols. The computing device 120 can also be configured to support other types of wireless communications protocols and can be configured to support multiple different wireless communications protocols. The wireless transmitter of the computing device 120 can be configured to send data to and/or receive data from other computing devices 120, the wireless transmitters 115, and/or one or more wireless base stations 140.

The computing device 120 can also be configured to measure signals from one or more wireless base stations or wireless access points, such as the wireless transmitters 115 and the wireless base station 140, and obtain timing measurements (e.g., for time of arrival (TOA) or observed time difference of arrival (OTDOA)), signal strength measurements (e.g., Receive Signal Strength Indication (RSSI)), RTT (round-trip time) and/or signal quality measurements for the wireless base stations. The pseudo-range measurements, timing measurements, signal strength measurements, and/or signal quality measurements may be used to derive a location estimate for the computing device 120. A location estimate may also be referred to as a position estimate, a position fix, etc. Two terrestrial wireless transmitters are illustrated in this example: 115a and 115b. However, in other implementations, more or less wireless transmitters 115 may be included. The computing device 120 can also be configured to use a combination of signals from one or more of the satellites 170, the wireless base station 140, and/or the wireless transmitters 115 to determine a position of the computing device 120.

Each of the wireless transmitters 115 can comprise a WLAN wireless access point configured to operate using the IEEE 802.11 wireless communication standards. But, in some implementations some or all of the wireless transmitters 115 may be configured to utilize other wireless communications protocols, and some network environments may include a more than one type of wireless transmitter 115. Furthermore, while the wireless transmitters 115 are identified as transmitters, the wireless transmitters 115 may be transceivers configured to send and/or receive data wirelessly. The wireless transmitters 115 can be connected to network 110 via a backhaul connection that provides a broadband connection to the network 110. The network 110 may be the Internet and/or a combination of one or more networks. For example, the wireless transmitter 115 may be connected to a DSL modem or a cable modem, depending upon the type of broadband service being used in that particular implementation. A wireless transmitter 115 can be associated with a mobile communication network provider and can be configured to communicate with the mobile communication network provider's network (not shown) via the network 110. The coverage area of the a wireless transmitter 115 may overlap with that of one or more macrocell base stations, such as wireless base station 140, or that of one or more other terrestrial transceivers.

The wireless base station 140 can be configured to provide wireless network connectivity to a plurality of computing devices 120. The wireless base station 140 may comprise a macrocell base station or other type of base station. The wireless base station 140 may have a much larger coverage area than the wireless transmitter 115 or may be a terrestrial transceiver that provides a coverage area that is of a similar size or of a smaller size than the coverage area provided by the wireless transmitters 115. Wireless base station 140 can be configured to communicate using one or more wireless communications protocols. While the example illustrated in FIG. 1 includes on a single wireless base station 140, in other implementations the network environment is likely to include more than wireless base station 140 which have coverage areas that may overlap at least in part.

The computing device 120 can be configured to include a Global Navigation Satellite System (GNSS) receiver configured to receive and measure signals from one or more satellites 170, such as satellites 170a and 170b, and to obtain pseudo-range measurements for the satellites 170. Satellites 170 may be part of a Global Navigation Satellite System (GNSS), which may be the United States Global Positioning System (GPS), the European Galileo system, the Russian GLONASS system, or some other GNSS. The GNSS receiver may also be configured to detect and receive signals from satellites 170 belonging to more than one GNSS system. For example, satellite 170a could belong to the GPS system while the satellite 170b could belong to the Galileo system. While the example network architecture illustrated herein illustrates only two satellites 170, other implementations may have more or less satellites available, may have satellites associated with one or more GNSS system, and the number of satellites visible to the computing device 120 may depend upon the current geographical location of the computing device 120 and the orbits of the satellites 170.

The location server 160 can be configured to provide location services to the computing device 120. For example, the location server 160 can be configured to provide almanac information and/or other information that the computing device 120 can use to determine the position of the computing device 120. The location server 160 can also be configured to assist the computing device 120 in determining the position of the computing device 120. For example, the location server 160 can be configured to receive signal measurements of signals received at the computing device 120 from wireless transmitters 115 and/or wireless base stations 140 and to determine a position of the computing device 120 based on those signals. While the location server 160 is represented as a single entity in the example implementation illustrated in FIG. 1, the logical functions performed by the location server 160 discussed herein can be implemented by more than one network entity.

The content server 180 can be configured to communicate with the computing device 120 via one or more intervening network connections. The content server 180 can be configured to provide electronic content, such as audio and/or video content to the computing device 120. The content server 180 can be configured to push the content to the computing device 120 and/or to receive requests from the computing device 120 for the content. Access to the content can be protected using one or more digital rights management schemes, and the computing device 120 can be configured to decrypt the protected content so that the content can be listened to or viewed on the computing device 120 or in some instances on a device associated with the computing device 120, such as an external display device and/or audio playback device.

The example network configuration illustrated in FIG. 1 is merely an example of one possible configuration of a network in which the techniques disclosed herein may be implemented. Other network configurations may include additional elements not illustrated in FIG. 1 and the various components may be interconnected in a different configuration than what is shown in FIG. 1. Furthermore, as discussed above, the computing device 120 can be implemented such that the computing device 120 includes a wired connection to the network 110 instead of or in addition to the wireless connections illustrated in FIG. 1. Furthermore, the computing device 120 can be configured to remain in a relatively fixed location, such as a set-top box, a server computer system, or desktop computer system that may be moved but typically remains in the same location in contrast to the implementation of the computing device 120 as a mobile device as illustrated in FIG. 1.

Example Hardware

Figure 2:
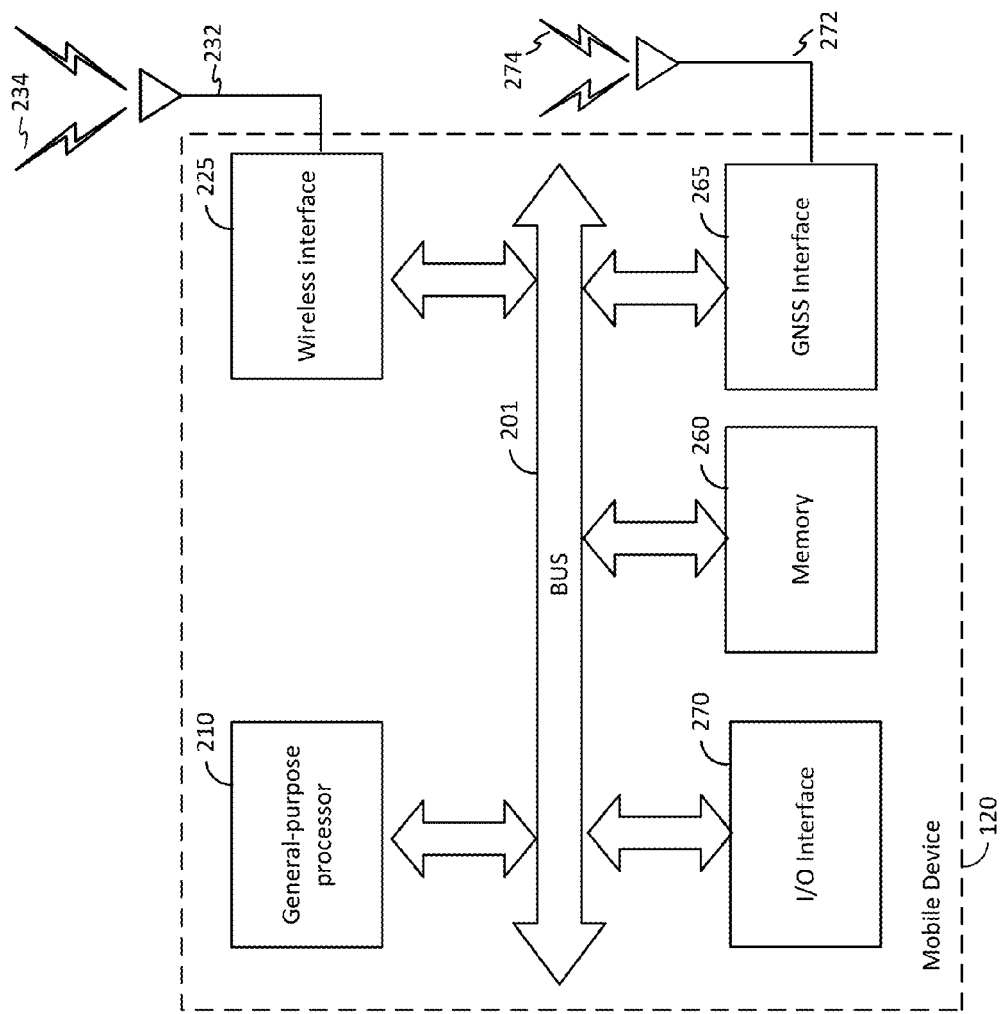
FIG. 2 is a block diagram of an example computing device that can be used to implement the computing device illustrated in FIG. 1.

FIG. 2 is a block diagram of a computing device that can be used to implement the computing device 120 illustrated in FIG. 1. The computing device 120 can be used to implement, at least in part, the processes illustrated in FIG. 4-12. The computing device 120 can be various types of computing devices, including but not limited to, laptop or other personal computer systems, tablet computers, mobile phones, smart phones, game consoles, wearable devices (e.g., a smart watch, head-mounted device, etc.) and/or other types of computing devices that can be configured to access digital rights management protected content and to allow a user of the device to consume such content. The computing device 120 can comprise a set-top box, desktop computer system, a computer server, or other type of computing device that typically remains in a fixed or semi-fixed location but may be moved if necessary.

The content can comprise audio or video components, or a combination thereof, that the computing device 120 can be configured to determine whether a user of the device is authorized to access and to render the content into audio and/or video content streams that can be output to the user of the computing device 120. The content can be encrypted and the computing device 120 can be configured to decrypt the content and/or perform other operations on the content to transform the content into a form that can be streamed to various input/output components of the computing device 120, such as a display, a speaker, headphone output, or a combination thereof, and/or an external device. For example, the computing device 120 can be configured to decrypt the content and to provide the content to another device via a wired or wireless connection. For example, the computing device 120 can be configured to provide the decrypted content to an external display device and/or audio playback device. The computing device 120 can be configured to perform the various processes illustrated in FIGS. 4-12 on the content prior to the content being released to the HLOS of the computing device 120.

The computing device 120 comprises a computer system including a general-purpose processor 210, a wireless interface 225, a GNSS interface 265, and a non-transitory memory 260, connected to each other by a bus 201. Other implementations of the computing device 120 may include additional elements not illustrated in the example implementation of FIG. 2 and/or may not include all of the elements illustrated in the example embodiment illustrated in FIG. 2. Some implementations of the computing device 120 may not include the GNSS interface 265 and/or the wireless interface 225. The computing device 120 can include a wired network interface instead of or in addition to the wireless interface 225. The computing device 120 may be implemented as a set-top box, desktop computing device, or other device that may be moved but typically not intended to be as portable as a mobile phone, tablet computer, a wearable device, or other such device that may be referred to as a mobile device.

The wireless interface 225 can include a wireless receiver, transmitter, transceiver, and/or other elements that enable the computing device 120 to send and/or receive data using WWAN, WLAN, and/or other wireless communication protocols. The wireless interface 225 can comprise one or more multi-mode modems capable of transmitting and receiving wireless signals using multiple wireless communications standards. The wireless interface 225 is connected by a line 232 to an antenna 234 for sending and receiving communications to/from the wireless transmitters 115, the wireless base station 140, and/or other wireless devices configured to communicate using wireless communication protocols. While the computing device 120 illustrated in FIG. 2 comprises a single wireless interface 225 and a single antenna 234, other implementations of the computing device 120 can include multiple wireless interfaces 225 and/or multiple antennas 234.

I/O interface 270 can provide one or more ports and/or other interfaces that can provide for data inputs and/or outputs to the computing device 120. For example, the I/O interface 270 can include one or more ports, such as a Universal Serial Bus (USB) port and/or other type of port that can be used to connect external devices to the computing device 120. The I/O interface 270 can also include one or more input devices, such as buttons, switches, a keypad, a touchscreen and/or other means for receiving input from a user. The I/O interface 270 can also include one or more means for outputting audio and/or visual content, such as a screen, a speaker, a headphone port and/or other means for outputting such content.

The GNSS interface 265 can include a wireless receiver and/or other elements that enable the computing device 120 to receive signals from transmitters associated with one or more GNSS systems. The GNSS interface 265 is connected by a line 272 to an antenna 274 for receiving signals from the GNSS transmitters, such as the satellites 170 illustrated in FIG. 1. The computing device 120 can be configured to use signals received from satellites associated with satellites and other transmitters associated with the GNSS systems to determine a position of the computing device 120. The computing device 120 can also be configured to use the signals received from the satellites and other transmitters associated with the GNSS systems in conjunction with signals received from wireless transmitters 115 and/or wireless base stations 140 to determine a position of the computing device 120.

The processor 210 can be an intelligent device, e.g., a personal computer central processing unit (CPU) such as those made by Intel® Corporation or AMD®, a microcontroller, an application specific integrated circuit (ASIC), etc. The memory 260 is a non-transitory storage device that can include random access memory (RAM), read-only memory (ROM), or a combination thereof. The memory 260 can store processor-readable, processor-executable software code containing instructions for controlling the processor 210 to perform functions described herein (although the description may read that the software performs the function(s)). The software can be loaded onto the memory 260 by being downloaded via a network connection, uploaded from a disk, etc. Further, the software may not be directly executable, e.g., requiring compiling before execution.

The software in the memory 260 is configured to enable the processor 210 to perform various actions, including implementing sending and/or receiving data from the wireless transmitters 115, the wireless base station 140, other computing devices 120, and/or other devices configured for wireless communication. The software in the memory 260 is also configured to enable the processor 210 to perform all or part of one or more of the processes illustrated in FIGS. 4-12. The functional modules implemented in software in the examples disclosed herein may alternatively be implemented in hardware or in a combination of hardware and software.

Figure 3:
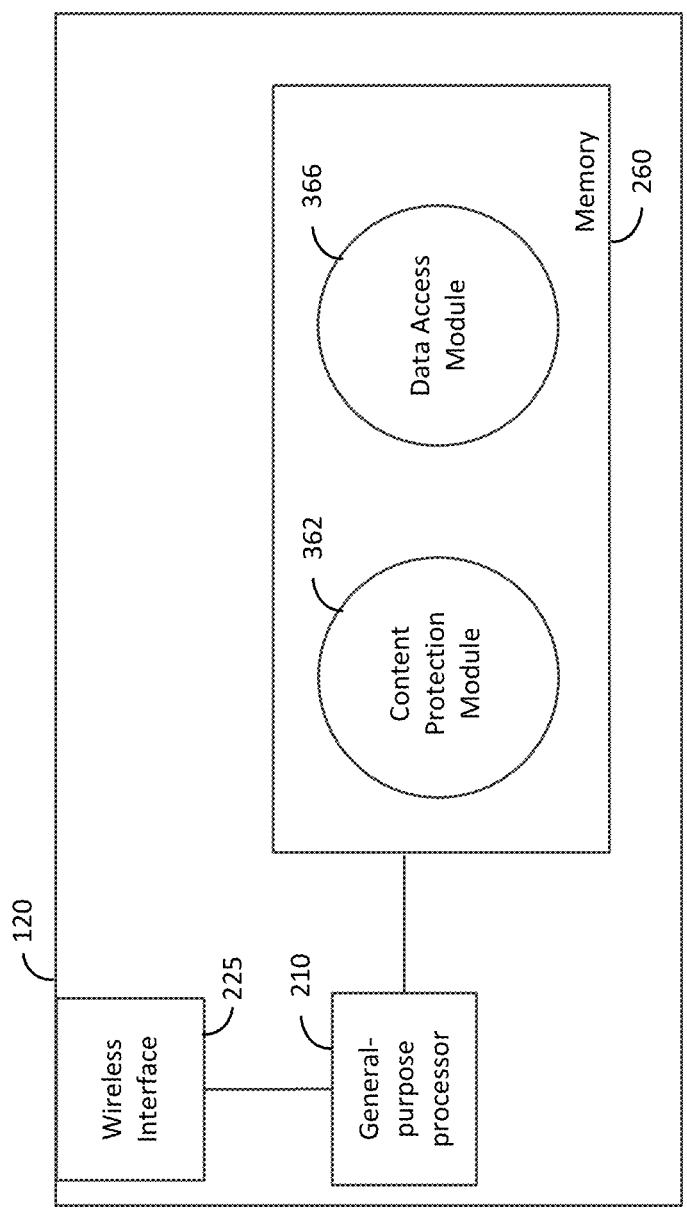
FIG. 3 is a functional block diagram of the computing device illustrated in FIG. 2 that illustrates functional modules of the computing device.

FIG. 3 is a functional block diagram of the computing device 120 illustrated in FIG. 2 that illustrates functional modules of the memory 260 shown in FIG. 2. For example, the computing device 120 can include a content protection module 362 and a data access module 366. The computing device 120 may also include one or more additional functional modules that provide other functionality to the computing device 120. The functional modules illustrated in FIG. 3 may be implemented as software executed by the processor 210 as illustrated in FIG. 3 or may be implemented in hardware or a combination of hardware and software. The computing device 120 illustrated in FIGS. 2 and 3 can be used to implement the computing device 120 associated with the processes illustrated in FIGS. 4-12. The processor 210 can also provide means for implementing the various modules of the computing device 120 discussed herein and may operate in conjunction with one or more modules implemented in firmware.

The content protection module 362 can provide means for implementing the processes illustrated in FIGS. 4-12. The content protection module 362 can be implemented as part of a secure processing environment on the computing device 120 that is configured to process digital rights management protected content. The content protection module 362 can also be implemented outside of a secure processing environment of the computing device 120, and the content protection module 362 can be configured to analyze content streams that the secure processing environment releases to the High-Level Operating System (HLOS) of the computing device 120 or an application operating outside of the secure processing environment. The techniques disclosed herein can be used with any type of content stream in which the audio content is output in an uncompressed format when released from the digital rights management protections placed on the digital rights management protected content so that the content can be utilized by an application on the computing device 120.

The content protection module 362 can be configured to analyze content streams that are purported to comprise audio content and to classify the audio stream as including audio-content or non-audio content. The content protection module 362 can obtain samples from the content stream and build one or more histograms of the content stream to classify the content stream as an audio content stream or non-audio content stream. The content protection module 362 can be configured to modify portions of the content stream responsive to the content stream being flagged as comprising non-audio content. The content protection module 362 can be configured to modify portions of the content stream such that if the content stream does actually comprise audio content the quality of the audio content will not be too degraded, while any video content included in the content stream will be rendered unplayable. The portions of the content stream modified by the content protection module 362 can correspond to the portions of the content stream from which the samples were obtained or can include portions in addition to or instead of the portions of the content stream corresponding to the samples obtained. The content protection module 362 can be configured to perform the techniques disclosed herein on multichannel content streams as well as single channel content streams to prevent an attacker from interleaving video content one or more channels and audio content on one or more channels in an attempt to circumvent the DRM protections on the video content.

The data access module 366 can be configured to store data in the memory 260 and/or other data storage devices associated with the computing device 120. The data access module 366 can also be configured to access data in the memory 260 and/or other data storage devices associated with the computing device 120. The data access module 366 can be configured to receive requests from other modules and/or components of the computing device 120 and to store and/or access data stored in the memory 260 and/or other data storage devices associated with the computing device 120.

Example Implementations

Figure 4:
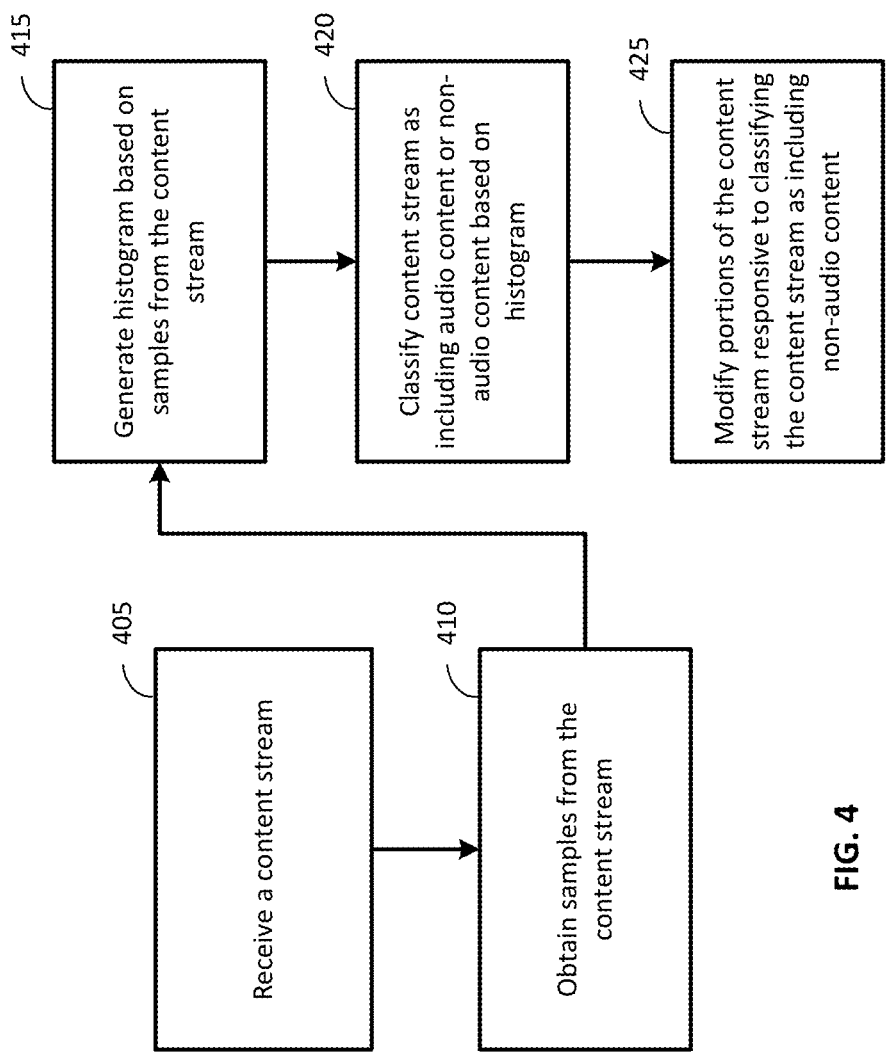
FIG. 4 is a flow diagram of an example process classifying purported audio content to prevent circumvention of digital rights protection of the purported audio content according to the techniques discussed herein.

FIG. 4 is a flow diagram of an example process classifying purported audio content to prevent circumvention of digital rights protection of the purported audio content according to the techniques discussed herein. The process illustrated in FIG. 4 can be implemented using the computing device 120 illustrated in FIGS. 1-3, unless otherwise specified. The content protection module 362 of the computing device 120 can provide means for performing the various stages of the process illustrated in FIG. 4 unless otherwise specified.

The computing device 120 may provide access to content that is protected by a digital rights management scheme, which may use both the same key and nonce for both the audio and video substreams of a premium content stream. Many devices may include a protected video processing path, in order to comply with the requirements of the DRM scheme used to protect the digital content, but many such schemes do not have a similar requirement for a protected audio processing path. An attacker may attempt to circumvent the DRM scheme by passing off a substream comprising video content as a substream comprising audio content to trick the device into decrypting the content stream and releasing the content to the High-Level Operating System (HLOS) of the computing device 120.

A content stream can be received (stage 405). The content stream can be a substream of a premium content stream that is purported to include audio content. The content protection module 362 can be configured to receive the substream of protected content that is purported to be audio content. The content stream may be tagged or otherwise marked indicating that the content stream is audio content. But, the substream of protected content may comprise video content that an attacker has tricked the computing device 120 into decrypting by marking the content substream as audio content. However, the unencrypted substream of content can be examined by the content protection module 362 prior to releasing the content to the HLOS of the device. The content protection module 362 can be configured to classify the content in the content stream as either audio content or non-audio content, and the content protection module 362 can be configured to alter the content stream in an irreversible manner responsive to determining that the content stream comprises non-audio content.

Samples can be obtained from the content stream (stage 410). The content stream can comprise audio content in a pulse-code modulation (PCM) format or other digital format that comprises digital samples that can approximate the analog waveforms of an audio content. The content stream can comprise a series of samples of the analog waveform that include an amplitude value of the audio waveform at a respective portion of the audio content represented by the sample. The samples can also be obtained from a spectral analysis of the contents of the audio stream. Various types of spectral analysis techniques are known in the art and can be applied to the content stream. The samples obtained from the spectral analysis may represent an amplitude, a magnitude, a phase value, or other value generated by the spectral analysis of the audio stream. The samples from different content streams can have different bit depths. The bit depth referring to the number of bits representing the amplitude or other value of each sample. Some content streams can include samples that have varying bit depths. The content protection module 362 can be configured to select a subset of the samples from the content stream that the content protection module 362 can use to classify the content stream as an audio content stream or a non-audio content stream.

A histogram can be generated based on samples obtained from the content stream (stage 415). A histogram that represents the frequency distributions within the samples obtained from the content stream can be generated. The content protection module 362 can be configured to bin the range of sample values that may be present in the content stream into a series of intervals. Each interval can represent a subset of amplitudes or other sample values that may be included in the samples obtained from the content stream. The number of bins or intervals included in a particular histogram can vary as can the width of the intervals. Various techniques can be used for generating the histogram. The number of bins or intervals included in the histogram and/or the range of values included in each bin or interval can depend on the type of sample data. Where the expected sample data includes an amplitude value, the amplitudes of the audio signal can be expected fall within a predetermined range, and that range can be divided up into a number of intervals to generate the histogram. Where spectral analysis data is included in the samples, the expected range of values for an audio sample can depend on the type of spectral analysis applied to the content stream, and the content protection module 362 can be configured to divide the sample data into intervals for generating the histogram.

The example processes illustrated FIGS. 6-10 and 12 can be used to generate the histogram used to classify the content stream as audio content or non-audio content. The content protection module 362 can be configured to utilize a specific technique for generating the histogram for specific types of uncompressed audio content or can be configured to select from a pool of predetermined processes for generating the histogram, such as the techniques illustrated in FIGS. 6-10 and 12 and/or other techniques. The content protection module 362 can also be configured to use an algorithm to select a technique for generating the histogram for each content stream from a pool of such processes. The content protection module 362 can be configured to select a different histogram generating process for each content stream. For example, the content protection module 362 can use a round-robin method or randomly select a process to be used.

Figure 5:
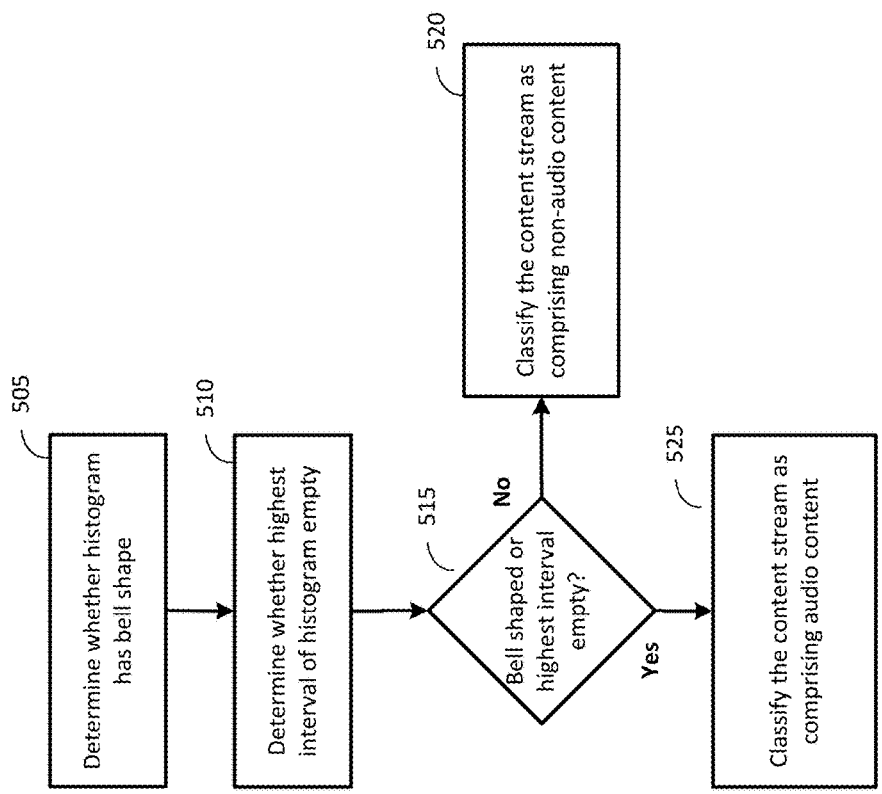
FIG. 5 is a flow diagram of an example process for classifying a content stream as audio content or non-audio content according to the techniques discussed herein.

The content stream can be classified as comprising audio content or non-audio content based on the histogram (stage 420). The content protection module 362 can be configured to compare the shape of the histogram to a symmetric bell curve shape to determine whether the distribution of the samples on the histogram exhibits such as shape. Samples obtained from an audio content stream are likely to exhibit such a distribution, with sample values closer to zero occurring more frequently than sample value further from zero. Samples obtained from a video content stream typically do not exhibit such a distribution. Therefore, the content protection module 362 can be configured to classify a content stream that is purported to be audio content as audio content responsive to the distribution having a bell curve-like shape. The content protection module 362 can be configured to determine whether a highest interval of the histogram is empty. The highest interval of the histogram represents instance where the sampled content would be very loud audio content, if the content is indeed audio content. Typical audio content would not include content that is this loud, but video content or other non-audio content being passed off an audio content stream may include samples that fall within the highest interval of the histogram. The content protection module 362 can be configured to classify the content stream as audio content the shape of the histogram is bell-shaped or the highest interval of the histogram is empty. FIGS. 5 and 11 illustrate example processes that can be used to classify the content stream as audio content or not audio content.

The content stream may comprise multiple channels, and the content protection module 362 can be configured to collect samples on each channel, generate a histogram for each channel, and determine whether the highest interval of each histogram is empty. This approach can be used to prevent an attacker from interleaving audio content one or more first channels with video content on one or more second channels. If any channel includes a highest sample interval that is not empty, the content protection module 362 can be configured to classify the content stream as comprising non-audio content.

Portions of the content stream can be modified responsive to classifying the content stream as comprising non-audio content (stage 425). The content protection module 362 can be configured to make alterations to portions of the content stream before releasing the content stream to the HLOS. The content protection module 362 can be configured to alter some or all of the samples obtained from the content stream, to replace the samples in the content stream, and to provide the altered content stream to the HLOS of the computing device 120.

Audio content streams are generally more forgiving of alternations to the content, while such alternations to a video stream is likely to render the video stream unplayable by most, if not all, video content players. The alterations to a content stream that erroneously flagged as comprising non-video content may introduce some noise into the audio content stream, but will not typically degrade the audio stream so significantly as to render the stream unplayable or significantly degrade the user experience. Accordingly, the content protection module 362 can alter portions of the content stream that is believed to included non-audio content to prevent an attacker from passing off video content as audio content in order circumvent the DRM protections on the video content.

The content protection module 362 can be configured to zero out the least significant bit or bits of each sample of the content stream and to provide the modified content stream to the HLOS. The content protection module 362 can be configured to replace the least significant bit or bits of each sample of the content stream with a random or pseudorandom value and to provide the modified content stream to the HLOS. The content protection module 362 can also be configured to add to the entire sample a small random value. The random value can be selected such that the extremes of the sample are saturated. The content protection module 362 can also be configured to determine the Hamming Code of the bits of the sample that are not to be replaced and to replace the bits to be replaced with the parity of the Hamming Code determined for the rest of the sample. The content protection module 362 can also be configured to add a constant value to all of the samples and/or to add a constant value selected from a predetermined pool of constant values to each of the samples. In yet other implementations, the content protection module 362 can be configured to add a constant value, which may be selected from a pool of such constant values, to the contents of the entire content stream. The content protection module 362 can also be configured to apply one or more audio effects to the content stream. The audio effect may be a predetermined audio effect or may be selected from a pool of audio effects. The audio effect or audio effects can be selected such that the audio effect or audio effects would not have a significant impact on the audio quality of an audio content stream, but would make a sufficient number of changes to the content stream such that any video content contained in the content stream would be rendered unplayable. Other techniques can also be implemented. The content protection module 362 can be configured to alternate between different techniques for modifying portions of the content stream to thwart an attacker from being able to recognize which portions of the content stream have been altered and to attempt to reverse the changes made in attempt to recover video content that has been identified as audio content in an attempt to thwart a content protection scheme.

The content protection module 362 can be configured to alter some or all of the channels of a content stream that is suspected to include non-audio content. For example, the content protection module 362 can be configured to alter portions of the content on only on those channels that are identified as potentially including interleaved video content. Stage 1105 of the process illustrated in FIG. 11 can be used to identify which channels have histograms that have a highest interval that is not empty. In other implementations, the content protection module 362 can be configured to alter portions of all or a subset of the channels of a content stream responsive to an indication that the content stream may include interleaved video content on one of the channels included in the content stream. The content protection module 362 can be configured to alter portions of the content stream such that the quality of audio content included in the content stream will not be degraded significantly while preventing interleaved video content from being playable.

A content that comprises genuine audio may potentially be misidentified as non-audio content utilizing the techniques discussed above. However, such a misidentification is most likely to occur where the audio content is very loud or at least one channel of a content streams having multiple channels is very loud. Introducing noise into the audio content by modifying the least significant bit or bits of the sample should produce little to no audible effect on the content stream. To illustrate this concept, if the histogram generated in stage 415 included four equal bins and the range of 120 decibels (dB), then a sample falling into the top interval of the histogram would have an intensity of at least 90 dB. If noise having an intensity of less than 6 dB were introduced to the sample by modifying the least significant bits of the sample, the noise introduced would be at least 84 dB below the sample. Accordingly, the noise would effectively be inaudible. The range of possible samples, the number of intervals used in the histogram, and the level of intensity of the noise added are examples that illustrates these concepts and are not intended to limit the techniques disclosed herein to these specific values.

FIG. 5 is a flow diagram of an example process for classifying a content stream as audio content or non-audio content according to the techniques discussed herein. The process illustrated in FIG. 5 can be implemented using the computing device 120 illustrated in FIGS. 1-3, unless otherwise specified. The content protection module 362 of the computing device 120 can provide means for performing the various stages of the process illustrated in FIG. 5 unless otherwise specified. The process illustrated in FIG. 5 can be used to implement stage 420 of the process illustrated in FIG. 4.

A determination can be made whether the histogram has a bell shape (stage 505). The content protection module 362 can be configured to compare the shape of the histogram to a symmetric bell curve shape to determine whether the distribution of the samples on the histogram exhibits such as shape. Samples obtained from an audio content stream are likely to exhibit such a distribution, with sample values closer to zero occurring more frequently than sample value further from zero. Samples obtained from a video content stream typically do not exhibit such a distribution. Therefore, the content protection module 362 can be configured to classify a content stream that is purported to be audio content as audio content responsive to the distribution having a bell curve-like shape.

A determination can be made whether the highest interval of the histogram is empty (stage 510). The content protection module 362 can be configured to determine whether a highest interval of the histogram is empty. The highest interval of the histogram represents instance where the sampled content would be very loud audio content and will typically be empty for most audio content, but may include data if the content stream includes non-audio content. Where the highest interval of the histogram is empty, the content is likely to be audio content and can be treated as such. The content protection module 362 can be configured allow the content stream to be provided to the HLOS of the computing device 120 without making any changes to portions of the content stream.

A determination can be made whether the histogram has been determined to have a bell shaped or the highest interval of the histogram has been determined to be empty (stage 515). The content protection module 362 can be configured to classify the content stream as comprising audio content if either the test of stage 505 or the test of stage 510 is true. The content protection module 362 can be configured such that stage 510 is optional. In such implementations, the content protection module 362 can be configured to make a classification of the content stream based on the whether the distribution of the samples illustrated in the histogram has a bell-shape. Where the content stream includes video content, the distribution of the samples will typically be more evenly distributed. While audio content will typically have a distribution where the samples cluster around the zero value and fall off in either direction from the zero value.

The content stream can be classified as comprising non-audio content responsive to the histogram neither having a bell shape nor the highest interval of the histogram being empty (stage 520). As discussed above, the content protection module 362 can be configured to classify the content as comprising non-audio content responsive to both the test performed in stage 505 and the test performed in stage 510 returning false as a result. In implementations where the test in stage 510 (which is optional) is not performed, the content protection module 362 can be configured to classify the content stream as comprising non-audio content responsive to the test performed in stage 505 returning false as a result.

The content stream can be classified as comprising audio content responsive to the histogram having either a bell shape or the highest interval of the histogram being empty (stage 525). As discussed above, the content protection module 362 can be configured to classify the content as comprising audio content responsive to either the test performed in stage 505 or the test performed in stage 510 returning trues as a result.

FIG. 6 is a flow diagram of an example process for generating a histogram according to the techniques discussed herein. The process illustrated in FIG. 6 can be implemented using the computing device 120 illustrated in FIGS. 1-3, unless otherwise specified. The content protection module 362 of the computing device 120 can provide means for performing the various stages of the process illustrated in FIG. 6 unless otherwise specified. The process illustrated in FIG. 6 can be used to implement stage 415 of the process illustrated in FIG. 4.

A range for the samples can be determined (stage 605). The content protection module 362 module can be configured to determine a range over which the samples collected from the content stream may be distributed. The content protection module 362 can be configured to obtain this information from predetermined range information stored in the memory 260 of the computing device 120. The predetermined range information can be expressed in a range of expected sound intensities that may be present in various types of premium content that may be accessed and decrypted on the computing device 120 or may be expressed in other scales where the samples are obtained from a spectral analysis of the content stream. The content stream can include information that identifies an expected range for the content stream. The content stream can also be associated with information that identifies the type of content purported to be included in the content stream, and the content protection module 362 can be configured to look up an appropriate range for the content stream in the predetermined range information stored in the memory 260 of the computing device 120. Where the samples comprise amplitude information from the content stream, the predetermined range can be based on a typical range of sound intensities that human hearing is capable of distinguishing. Typically this range is expressed in decibel values ranging from approximately −20 dB to 140 dB, where sounds at the top of this range would be intense enough to inflict pain and sounds at the bottom of the range may be inaudible to many. Where the samples comprise other information obtained from a spectral analysis of the content stream, the range information can be dependent on the spectral analysis technique that was applied to the content stream. The content protection module 362 can be configured to select the appropriate range information based on the spectral analysis technique that was used to process the content stream. The content protection module 362 can be configured to obtain information identifying the type of spectral analysis that was performed from the processor 210 or another module of the computing device 120 or can be configured to perform the spectral analysis on the content stream, and thus, would already have access to the type of spectral analysis that was performed on the content stream.

The range can be divided into an odd number of equal intervals in which the middle interval is centered around a zero value (stage 610). The content protection module 362 can be configured to divide the range determined in stage 605 into an odd number of equal intervals. The content protection module 362 can be configured to divide the range into a predetermined number of intervals, which can be determined based on an interval value stored in the memory 260 or in another memory location of the computing device 120. Alternatively, the number of intervals to be used can be hardcoded into the content protection module 362. The content protection module 362 can also be configured to use a random or pseudorandom algorithm to select a predetermined number of intervals into which the range is to be divided. The content protection module 362 can be configured to place an upper limit on the number of intervals into which the range is to be divided. The content protection module 362 can be configured to subdivide the range into the determined number of intervals such that the middle interval is centered on a zero value. The content protection module 362 can be configured to use a different number of intervals for different channels in a content stream or to use the same number of intervals for a content stream once a number of intervals has been determined. The content protection module 362 can also be configured to divide the range into unequally sized intervals in some implementations. The content protection module 362 can be configured to obtain the interval size for each of the intervals from the memory 260. The content protection module 362 can also be configured to generate the interval size using a random or pseudorandom algorithm.

The histogram can be generated based on the samples collected from the content stream and the intervals determined (stage 615). The content protection module 362 can be configured to increment a counter associated with each interval for each sample that falls within the interval, such that the histogram represents a distribution of the samples over the range determined in stage 605. The content protection module 362 can be configured to use the histogram to classify the content stream as comprising audio content or comprising non-audio content.

FIG. 7 is a flow diagram of another example process for generating a histogram according to the techniques discussed herein. The process illustrated in FIG. 7 can be implemented using the computing device 120 illustrated in FIGS. 1-3, unless otherwise specified. The content protection module 362 of the computing device 120 can provide means for performing the various stages of the process illustrated in FIG. 7 unless otherwise specified. The process illustrated in FIG. 7 can be used to implement stage 415 of the process illustrated in FIG. 4.

A range for the samples can be determined (stage 705). The content protection module 362 module can be configured to determine a range over which the samples collected from the content stream may be distributed. The content protection module 362 can be configured to obtain this information from predetermined range information stored in the memory 260 of the computing device 120. The predetermined range information can be expressed in a range of expected sound intensities that may be present in various types of premium content that may be accessed and decrypted on the computing device 120 or may be expressed in other scales where the samples are obtained from a spectral analysis of the content stream. The content stream can include information that identifies an expected range for the content stream. The content stream can also be associated with information that identifies the type of content purported to be included in the content stream, and the content protection module 362 can be configured to look up an appropriate range for the content stream in the predetermined range information stored in the memory 260 of the computing device 120. Where the samples comprise amplitude information from the content stream, the predetermined range can be based on a typical range of sound intensities that human hearing is capable of distinguishing. Typically this range is expressed in decibel values ranging from approximately −20 dB to 140 dB, where sounds at the top of this range would be intense enough to inflict pain and sounds at the bottom of the range may be inaudible to many. Where the samples comprise other information obtained from a spectral analysis of the content stream, the range information can be dependent on the spectral analysis technique that was applied to the content stream. The content protection module 362 can be configured to select the appropriate range information based on the spectral analysis technique that was used to process the content stream. The content protection module 362 can be configured to obtain information identifying the type of spectral analysis that was performed from the processor 210 or another module of the computing device 120 or can be configured to perform the spectral analysis on the content stream, and thus, would already have access to the type of spectral analysis that was performed on the content stream.

The range can be divided into an even number of equal intervals in which the two middle interval are adjacent to a zero value (stage 710). The content protection module 362 can be configured to divide the range determined in stage 605 into an even number of equal intervals. The content protection module 362 can be configured to divide the range into a predetermined number of intervals, which can be determined based on an interval value stored in the memory 260 or in another memory location of the computing device 120. Alternatively, the number of intervals to be used can be hardcoded into the content protection module 362. The content protection module 362 can also be configured to use a random or pseudorandom algorithm to select a predetermined number of intervals into which the range is to be divided. The content protection module 362 can be configured to place an upper limit on the number of intervals into which the range is to be divided. The content protection module 362 can be configured to subdivide the range into the determined number of intervals such that the two middle intervals are centered around a zero value. The content protection module 362 can be configured to use a different number of intervals for different channels in a content stream or to use the same number of intervals for a content stream once a number of intervals has been determined. The content protection module 362 can also be configured to divide the range into unequally sized intervals in some implementations. The content protection module 362 can be configured to obtain the interval size for each of the intervals from the memory 260. The content protection module 362 can also be configured to generate the interval size using a random or pseudorandom algorithm.

The histogram can be generated based on the samples collected from the content stream and the intervals determined (stage 715). The content protection module 362 can be configured to increment a counter associated with each interval for each sample that falls within the interval, such that the histogram represents a distribution of the samples over the range determined in stage 605. The content protection module 362 can be configured to use the histogram to classify the content stream as comprising audio content or comprising non-audio content.

Figures 8, 9:
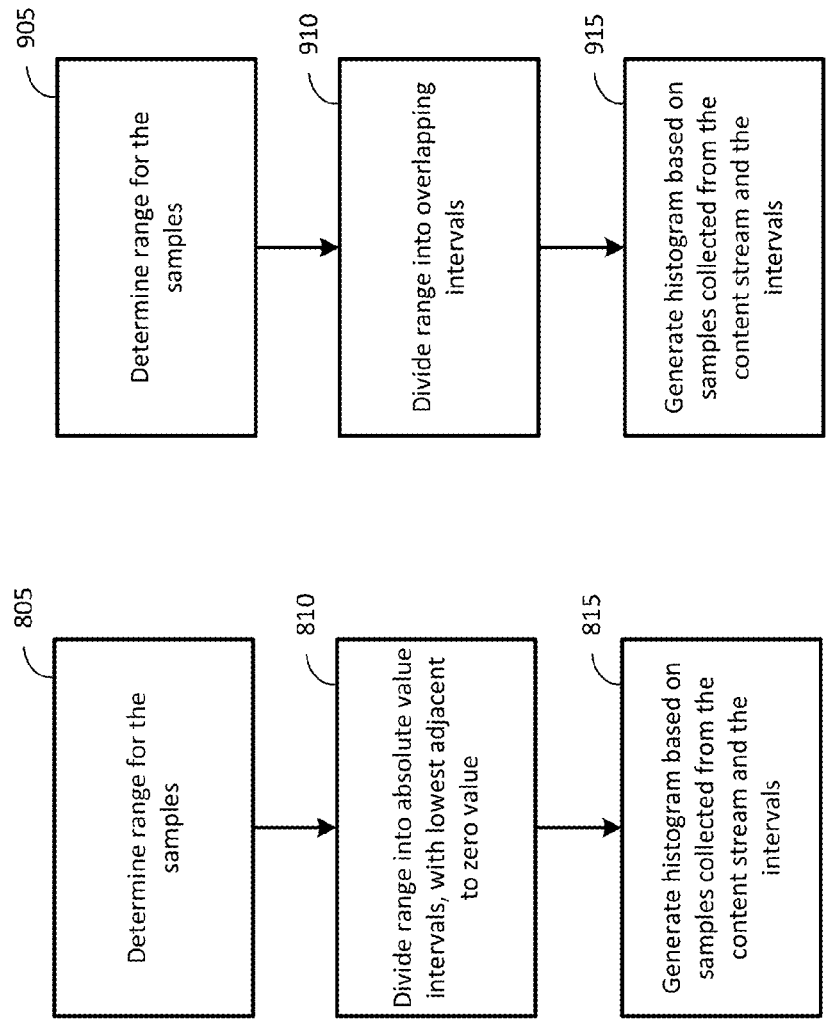
FIG. 8 is a flow diagram of another example process for generating a histogram according to the techniques discussed herein.
FIG. 9 is a flow diagram of another example process for generating a histogram according to the techniques discussed herein.

FIG. 8 is a flow diagram of another example process for generating a histogram according to the techniques discussed herein. The process illustrated in FIG. 8 can be implemented using the computing device 120 illustrated in FIGS. 1-3, unless otherwise specified. The content protection module 362 of the computing device 120 can provide means for performing the various stages of the process illustrated in FIG. 8 unless otherwise specified. The process illustrated in FIG. 8 can be used to implement stage 415 of the process illustrated in FIG. 4.

A range for the samples can be determined (stage 805). The content protection module 362 module can be configured to determine a range over which the samples collected from the content stream may be distributed. The content protection module 362 can be configured to obtain this information from predetermined range information stored in the memory 260 of the computing device 120. The predetermined range information can be expressed in a range of expected sound intensities that may be present in various types of premium content that may be accessed and decrypted on the computing device 120 or may be expressed in other scales where the samples are obtained from a spectral analysis of the content stream. The content stream can include information that identifies an expected range for the content stream. The content stream can also be associated with information that identifies the type of content purported to be included in the content stream, and the content protection module 362 can be configured to look up an appropriate range for the content stream in the predetermined range information stored in the memory 260 of the computing device 120. Where the samples comprise amplitude information from the content stream, the predetermined range can be based on a typical range of sound intensities that human hearing is capable of distinguishing. Typically this range is expressed in decibel values ranging from approximately −20 dB to 140 dB, where sounds at the top of this range would be intense enough to inflict pain and sounds at the bottom of the range may be inaudible to many. Where the samples comprise other information obtained from a spectral analysis of the content stream, the range information can be dependent on the spectral analysis technique that was applied to the content stream. The content protection module 362 can be configured to select the appropriate range information based on the spectral analysis technique that was used to process the content stream. The content protection module 362 can be configured to obtain information identifying the type of spectral analysis that was performed from the processor 210 or another module of the computing device 120 or can be configured to perform the spectral analysis on the content stream, and thus, would already have access to the type of spectral analysis that was performed on the content stream.

The frequency range can be divided into absolute value intervals in which the lowest interval is adjacent to a zero value (stage 810). The content protection module 362 can be configured to divide the range determined in stage 605 into a series of intervals having a positive value range with the lowest interval being adjacent to zero. The content protection module 362 can be configured to divide the range into a predetermined number of intervals, which can be determined based on an interval value stored in the memory 260 or in another memory location of the computing device 120. Alternatively, the number of intervals to be used can be hardcoded into the content protection module 362. The content protection module 362 can also be configured to use a random or pseudorandom algorithm to select a predetermined number of intervals into which the range is to be divided. The content protection module 362 can be configured to place an upper limit on the number of intervals into which the range is to be divided. The content protection module 362 can be configured to subdivide the range into the determined number of intervals such that the lowest interval is adjacent zero value. The content protection module 362 can be configured to use a different number of intervals for different channels in a content stream or to use the same number of intervals for a content stream once a number of intervals has been determined. The content protection module 362 can also be configured to divide the range into unequally sized intervals in some implementations. The content protection module 362 can be configured to obtain the interval size for each of the intervals from the memory 260. The content protection module 362 can also be configured to generate the interval size using a random or pseudorandom algorithm.

The histogram can be generated based on the samples collected from the content stream and the intervals determined (stage 815). The content protection module 362 can be configured to increment a counter associated with each interval for each sample that the absolute value of the sample falls within the interval, such that the histogram represents a distribution of the samples over the range determined in stage 805. The content protection module 362 can be configured to use the histogram to classify the content stream as comprising audio content or comprising non-audio content.

FIG. 9 is a flow diagram of another example process for generating a histogram according to the techniques discussed herein. The process illustrated in FIG. 9 can be implemented using the computing device 120 illustrated in FIGS. 1-3, unless otherwise specified. The content protection module 362 of the computing device 120 can provide means for performing the various stages of the process illustrated in FIG. 9 unless otherwise specified. The process illustrated in FIG. 9 can be used to implement stage 415 of the process illustrated in FIG. 4.

A range for the samples can be determined (stage 905). The content protection module 362 module can be configured to determine a range over which the samples collected from the content stream may be distributed. The content protection module 362 can be configured to obtain this information from predetermined range information stored in the memory 260 of the computing device 120. The predetermined range information can be expressed in a range of expected sound intensities that may be present in various types of premium content that may be accessed and decrypted on the computing device 120 or may be expressed in other scales where the samples are obtained from a spectral analysis of the content stream. The content stream can include information that identifies an expected range for the content stream. The content stream can also be associated with information that identifies the type of content purported to be included in the content stream, and the content protection module 362 can be configured to look up an appropriate range for the content stream in the predetermined range information stored in the memory 260 of the computing device 120. Where the samples comprise amplitude information from the content stream, the predetermined range can be based on a typical range of sound intensities that human hearing is capable of distinguishing. Typically this range is expressed in decibel values ranging from approximately −20 dB to 140 dB, where sounds at the top of this range would be intense enough to inflict pain and sounds at the bottom of the range may be inaudible to many. Where the samples comprise other information obtained from a spectral analysis of the content stream, the range information can be dependent on the spectral analysis technique that was applied to the content stream. The content protection module 362 can be configured to select the appropriate range information based on the spectral analysis technique that was used to process the content stream. The content protection module 362 can be configured to obtain information identifying the type of spectral analysis that was performed from the processor 210 or another module of the computing device 120 or can be configured to perform the spectral analysis on the content stream, and thus, would already have access to the type of spectral analysis that was performed on the content stream.

The range can be divided into overlapping intervals (stage 910). In contrast the techniques illustrated in FIGS. 6-8, in the technique illustrated in FIG. 9, the content protection module 362 can be configured to divide intervals that overlap the adjacent intervals in part. The content protection module 362 can be configured to one of the techniques discussed with respect to stages 610, 710, and 810 for determining how many intervals into which to divide the range. The content protection module 362 can be configured to select the intervals such that they overlap by a predetermined percentage or by some predetermined value. The content protection module 362 can be hardcoded with these values or can be configured to obtain these values from the memory 260 of the computing device 120 or from another memory of the computing device 120.

The histogram can be generated based on the samples collected from the content stream and the intervals determined (stage 915). The content protection module 362 can be configured to increment a counter associated with each interval for each sample that falls within the interval, such that the histogram represents a distribution of the samples over the range determined in stage 605. The content protection module 362 can be configured to use the histogram to classify the content stream as comprising audio content or comprising non-audio content.

FIG. 10 is a flow diagram of another example process for generating histograms according to the techniques discussed herein. The process illustrated in FIG. 10 can be implemented using the computing device 120 illustrated in FIGS. 1-3, unless otherwise specified. The content protection module 362 of the computing device 120 can provide means for performing the various stages of the process illustrated in FIG. 10 unless otherwise specified. The process illustrated in FIG. 10 can be used to implement stage 415 of the process illustrated in FIG. 4 where the content stream include more than one channel.

The channels being used to transmit the content stream can be determined (stage 1005). The content protection module 362 can be configured to determine how many channels are being used to transmit the content stream. The number of channels that may be used to transmit a content stream can vary depending on the format of the content stream and can also vary based on the content to be transmitted. The content protection module 362 can be configured to determine how many channels are being used to transmit the content stream based on information associated with and/or included in the content stream itself. The content protection module 362 can also be configured to determine the number of content streams by determine a format of the content stream and by looking up the number of channels that can be supported by that format. The content protection module 362 can be configured to look up the format information in the memory 260 of the computing device and/or to obtain the format information from an external source via the Internet or other network connection. For example, a content stream coded according to the Advanced Audio Coding (AAC) standard can include as many as forty-eight audio channels in one stream in addition to other related audio channels and data streams. The content protection module 362 can be configured to identify which channels are being used in a particular content stream so that content being transmitted on these channels can be sampled to determine whether an attacker has attempted to interleave video content on one or more of these channels. The AAC standard is one example of the various audio standards that can be used with the techniques disclosed herein. The techniques disclosed herein can be applied to other coding standards, including those which can include multiple audio channels.

A histogram can be generated for each of the channels being used to transmit the content stream (stage 1010). The content protection module 362 can be configured to generate a histogram for each channel as discussed above. For example, the content protection module can be configured to generate the histogram for each channel using one of the processes illustrated in FIGS. 6-9. The content protection module 362 can be configured to use the histograms to classify the content stream as comprising audio content or comprising non-audio content.

FIG. 11 is a flow diagram of an example process for classifying a content stream having multiple channels as audio content or non-audio content according to the techniques discussed herein. The process illustrated in FIG. 11 can be implemented using the computing device 120 illustrated in FIGS. 1-3, unless otherwise specified. The content protection module 362 of the computing device 120 can provide means for performing the various stages of the process illustrated in FIG. 11 unless otherwise specified. The process illustrated in FIG. 11 can be used to implement stage 420 of the process illustrated in FIG. 4. The process illustrated in FIG. 11 can be used to implement stage 420 of the process illustrated in FIG. 4 where histograms have been generated for each channel of a multichannel content stream, such as, where FIG. 10 is used to implement stage 415.

The highest interval for each of the histograms associated with each respective one of the audio content channels can be examined to determine whether the interval is empty (stage 1105). The content protection module 362 can be configured to determine whether a highest interval of the histogram is empty for the histogram associated with each of the channels included in the content stream. The highest interval of the histogram represents instance where the sampled content would be very loud audio content and will typically be empty for most audio content, but may include data if the content stream includes non-audio content. Where the highest interval of the histogram is empty, the content is likely to be audio content and can be treated as such.

A determination can be made whether the highest interval for each of the histograms associated with each respective one of the audio content channels is empty (stage 1110). If the content protection module 362 determines that the highest interval was empty for all of the channels, the process can continue with stage 1120. Otherwise, the content protection module 362 can be configured to continue the process with stage 1115.

The content stream can be classified as comprising non-audio content responsive to responsive to at least one of the histograms highest interval not being empty (stage 1115). The content protection module 362 can be configured to classify any content streams that include channels on which video content may potentially have been interleaved as comprising non-audio content. The content may actually be audio content, but to prevent possible circumvention of digital rights management protections, the content protection module 362 can be configured to flag any suspect content streams such that those content streams can be altered in a fashion that should not significantly compromise audio quality but should prevent the decoding of video content present in the content stream.

The content stream can be classified as comprising audio content responsive to all of the the histograms highest interval which is empty (stage 1120). The content protection module 362 can classify the content a stream as comprising audio content where all of the histograms include an empty highest interval, because such an occurrence is unlikely in instances where an attacker is attempting to circumvent digital rights protections on content by interleaving video content with an audio content stream in order to trick the computing device 120 into decrypting the video content along with the audio content.

Figure 12:
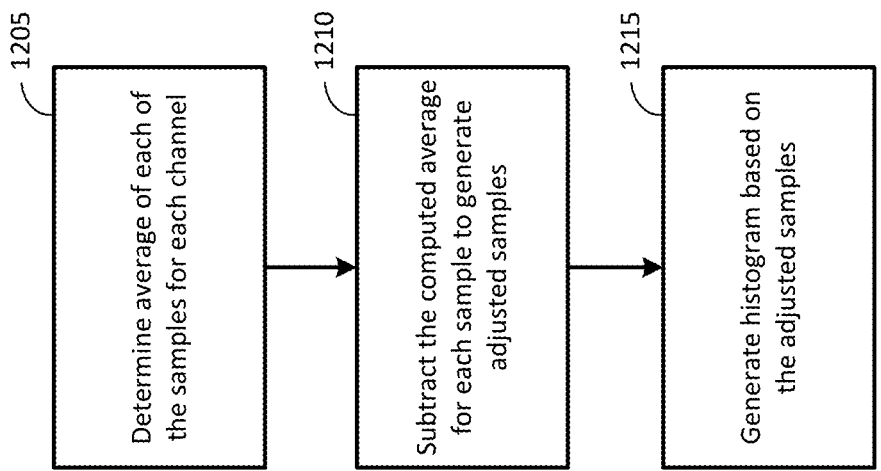
FIG. 12 is a flow diagram of another example process for generating a histogram according to the techniques discussed herein.

FIG. 12 is a flow diagram of another example process for generating a histogram according to the techniques discussed herein. The process illustrated in FIG. 12 can be implemented using the computing device 120 illustrated in FIGS. 1-3, unless otherwise specified. The process illustrated in FIG. 12 can be used to remove a DC offset from the samples prior to generating the histogram. The DC offset represents a mean amplitude displacement from zero. The DC offset may be introduced as a fixed voltage offset during the conversion of an audio signal to a digital signal. The content protection module 362 of the computing device 120 can provide means for performing the various stages of the process illustrated in FIG. 12 unless otherwise specified. The process illustrated in FIG. 12 can be used to implement stage 415 of the process illustrated in FIG. 4. Portions of the process illustrated in FIG. 12 can be combined with that of FIG. 8 to ensure that the DC offset has been removed prior to generating the histogram. For example, stages 1205 and 1205 can be performed prior to stages 805 or 810 of the process illustrated in FIG. 12. The processing performed in stages 1205 and 1210 can also be performed prior to the processes illustrated in FIGS. 6, 7, and 9. The process illustrated in FIG. 12 can be performed for each channel in content streams that comprise multiple channels.

An average of the samples for each channel can be determined (stage 1205). The content protection module 362 of the computing device 120 can be configured to determine the average of the samples collected from the content stream in stage 410 of the process illustrated in FIG. 4. The average can be used to estimate the DC offset present in the content stream.

The computed average can be subtracted from each of the samples to generate adjusted samples (stage 1210). The content protection module 362 can be configured to subtract the average value determined in stage 1205 from each of the samples collected in stage 410 to generate adjusted samples that have the DC offset removed, or at least an approximation of the DC offset removed.

The histogram can be generated based on the adjusted samples (stage 1215). The content protection module 362 can be configured to generate the histogram as discussed above. For example, the content protection module can be configured to generate the histogram using one of the processes illustrated in FIGS. 6-9. The content protection module 362 can be configured to use the histogram to classify the content stream as comprising audio content or comprising non-audio content.

The methodologies described herein may be implemented by various means depending upon the application. For example, these methodologies may be implemented in hardware, firmware, software, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media. Tangible media include one or more physical articles of machine readable media, such as random access memory, magnetic storage, optical storage media, and so on.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. Such media also provide examples of non-transitory media, which can be machine readable, and wherein computers are an example of a machine that can read from such non-transitory media.

The generic principles discussed herein may be applied to other implementations without departing from the spirit or scope of the disclosure or claims.

What is claimed is:

1. A method for preventing circumvention of digital rights management protections on electronic content, the method comprising:
   receiving a content stream;
   obtaining samples of data from the content stream indicative of whether the content stream comprises non-audio content;
   generating a histogram based on the samples from the content stream by dividing the samples into a plurality of intervals;
   classifying the content stream as including audio content or non-audio content based on the histogram by determining whether the histogram exhibits a distribution that is indicative of the content stream comprising non-audio content; and
   modifying portions of the content stream responsive to classifying the content stream as including non-audio content.

2. The method of claim 1, wherein modifying the portions of the content stream comprises:
   modifying the content stream such that video content included in the content stream is rendered unplayable.

3. The method of claim 1, wherein modifying the portions of the content stream comprises:

modifying the content stream such that audio content included in the content stream remains playable with minimally audible audio artifacts.

4. The method of claim 1, wherein modifying the portions of the content stream comprises:
modifying one or more least significant bits of the content stream.

5. The method of claim 1, wherein classifying the content stream as audio content or non-audio content further comprises:
determining whether a highest sample interval of the histogram is empty.

6. The method of claim 5, wherein classifying the content stream as audio content or non-audio content further comprises:
classifying the content stream as audio content responsive to the histogram comprising a bell shape or the highest sample interval of the histogram being empty.

7. The method of claim 1, wherein generating the histogram based on the samples from the content stream further comprises:
generating a respective histogram for each audio channel of the content stream.

8. The method of claim 7, wherein classifying the content stream as audio content or non-audio content further comprises:
classifying the content stream as audio content responsive to the histogram comprising a bell shape or a highest sample interval of all of the respective histograms is empty.

9. An apparatus comprising:
means for receiving a content stream;
means for obtaining samples of data from the content stream indicative of whether the content stream comprises non-audio content;
means for generating a histogram based on the samples from the content stream by dividing the samples into a plurality of intervals;
means for classifying the content stream as including audio content or non-audio content based on the histogram by determining whether the histogram exhibits a distribution that is indicative of the content stream comprising non-audio content; and
means for modifying portions of the content stream responsive to classifying the content stream as non-audio content.

10. The apparatus of claim 9, wherein the means for modifying the portions of the content stream comprises:
means for modifying the content stream such that video content included in the content stream is rendered unplayable.

11. The apparatus of claim 9, wherein the means for modifying the portions of the content stream comprises:
means for modifying the content stream such that audio content included in the content stream remains playable with minimally audible audio artifacts.

12. The apparatus of claim 9, wherein the means for classifying the content stream as audio content or non-audio content further comprises:
means for determining whether a highest sample interval of the histogram is empty.

13. The apparatus of claim 12, wherein the means for classifying the content stream as audio content or non-audio content further comprises:

means for classifying the content stream as audio content responsive to the histogram comprising a bell shape or the highest sample interval of the histogram being empty.

14. The apparatus of claim 9, wherein the means for generating the histogram based on the samples from the content stream further comprises:
means for generating a respective histogram for each audio channel of the content stream.

15. The apparatus of claim 14, wherein the means for classifying the content stream as audio content or non-audio content further comprises:
means for classifying the content stream as audio content responsive to the histogram comprising a bell shape or a highest sample interval of all of the respective histograms is empty.

16. A computing device comprising:
a hardware processor configured to:
receive a content stream;
obtain samples of data from the content stream indicative of whether the content stream comprises non-audio content;
generate a histogram based on the samples from the content stream by dividing the samples into a plurality of intervals;
classify the content stream as audio content or non-audio content based on the histogram by determining whether the histogram exhibits a distribution that is indicative of the content stream comprising non-audio content; and
modify portions of the content stream responsive to classifying the content stream as non-audio content.

17. The computing device of claim 16, wherein the processor being configured to modify the portions of the content stream is further configured to:
modify the content stream such that video content included in the content stream is rendered unplayable.

18. The computing device of claim 16, wherein the processor being configured to modify the portions of the content stream is further configured to:
modify the content stream such that audio content included in the content stream remains playable with minimally audible audio artifacts.

19. The computing device of claim 16, wherein the processor being configured to modify the portions of the content stream is further configured to:
modify one or more least significant bits of the content stream.

20. The computing device of claim 16, wherein the processor being configured to classify the content stream as audio content or non-audio content further is further configured to:
determine whether a highest sample interval of the histogram is empty.

21. The computing device of claim 20, wherein the processor being configured to classify the content stream as audio content or non-audio content further is further configured to:
classify the content stream as audio content responsive to the histogram comprising a bell shape or the highest sample interval of the histogram being empty.

22. The computing device of claim 16, wherein the processor being configured to generate the histogram based on the samples from the content stream is further configured to:
generating a respective histogram for each audio channel of the content stream.

23. The computing device of claim 22, wherein the processor being configured to classify the content stream as audio content or non-audio content is further to:
classify the content stream as audio content responsive to the histogram comprising a bell shape or a highest sample interval of all of the respective histograms is empty.

24. A non-transitory, computer-readable medium, having stored thereon computer-readable instructions for preventing circumvention of digital rights management protections on electronic content, comprising instructions configured to cause a computer to:
receive a content stream;
obtain samples of data from the content stream indicative of whether the content stream comprises non-audio content;
generate a histogram based on the samples from the content stream by dividing the samples into a plurality of intervals;
classify the content stream as comprising audio content or non-audio content based on the histogram by determining whether the histogram exhibits a distribution that is indicative of the content stream comprising non-audio content; and
modify portions of the content stream responsive to classifying the content stream as non-audio content.

25. The non-transitory, computer-readable medium of claim 24, wherein the instructions configured to cause the computer to modify the portions of the content stream further comprise instructions configured to cause the computer to:
modify the content stream such that video content included in the content stream is rendered unplayable.

26. The non-transitory, computer-readable medium of claim 24, wherein the instructions configured to cause the computer to modify the portions of the content stream further comprise instructions configured to cause the computer to:
modify the content stream such that audio content included in the content stream remains playable with minimally audible audio artifacts.

27. The non-transitory, computer-readable medium of claim 24, wherein the instructions configured to cause the computer to classify the content stream as audio content or non-audio content further comprise instructions configured to cause the computer to:
determine whether a highest sample interval of the histogram is empty.

28. The non-transitory, computer-readable medium of claim 27, wherein the instructions configured to cause the computer to classify the content stream as audio content or non-audio content further comprise instructions configured to cause the computer to:
classify the content stream as audio content responsive to the histogram comprising a bell shape or the highest sample interval of the histogram being empty.

29. The non-transitory, computer-readable medium of claim 24, wherein the instructions configured to cause the computer to generate the histogram based on the samples from the content stream further comprise instructions configured to cause the computer to:
generate a respective histogram for each audio channel of the content stream.

30. The non-transitory, computer-readable medium of claim 29, wherein the instructions configured to cause the computer to classify the content stream as audio content or non-audio content further comprise instructions configured to cause the computer to:
classify the content stream as audio content responsive to the histogram comprising a bell shape or a highest sample interval of all of the respective histograms is empty.

* * * * *